United States Patent
Kasibhotla et al.

(10) Patent No.: US 8,376,687 B2
(45) Date of Patent: Feb. 19, 2013

(54) SYSTEM AND METHOD FOR COOLING STEAM TURBINE ROTORS

(75) Inventors: Ravi Shankar Venkata Kasibhotla, Vijayawada (IN); Anantha Padmanabhan Bhagavatheeswaran, Bangalore (IN); Fred Thomas Willett, Jr., Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 12/577,884

(22) Filed: Oct. 13, 2009

(65) Prior Publication Data

US 2011/0085886 A1    Apr. 14, 2011

(51) Int. Cl.
*F01D 5/08* (2006.01)
*F01D 25/12* (2006.01)

(52) U.S. Cl. ......... 415/1; 415/100; 415/115; 415/199.5; 415/221; 416/1; 416/97 R; 416/198 R

(58) Field of Classification Search .................. 415/100, 415/101, 115, 116, 117, 177, 199.5, 220, 415/221, 1; 416/95, 96 R, 97 R, 198 A, 1
See application file for complete search history.

(56) References Cited

U.S. PATENT DOCUMENTS

| | | | | |
|---|---|---|---|---|
| 2,552,239 A | * | 5/1951 | Warren | 415/112 |
| 3,990,230 A | * | 11/1976 | Kuwashima et al. | 415/17 |
| 4,551,063 A | * | 11/1985 | Raschke et al. | 415/115 |
| 6,824,351 B2 | | 11/2004 | Endries et al. | |
| 7,101,144 B2 | * | 9/2006 | Haje et al. | 415/115 |
| 7,488,153 B2 | * | 2/2009 | Reigl | 415/177 |

* cited by examiner

*Primary Examiner* — Igor Kershteyn
(74) *Attorney, Agent, or Firm* — Cantor Colburn LLP

(57) ABSTRACT

A steam turbine includes a rotor having a plurality of early stages and a stator portion surrounding a portion of the rotor and arranged such that a leakage region exists between the stator portion and the rotor and having a cooling steam channel that passes cooling steam from one portion of the stator portion to the leakage region. The turbine also includes at least one cooling steam transmission channel axially displaced about the rotor that receives the cooling steam from the leakage region and provides it to at least a portion of the early stages.

18 Claims, 7 Drawing Sheets

United States Patent US 8,376,687 B2

SYSTEM AND METHOD FOR COOLING STEAM TURBINE ROTORS

BACKGROUND OF THE INVENTION

The subject matter disclosed herein relates to steam turbines and, in particular, to providing cooling to rotors of the turbine during operation.

In power generation systems where waste heat from one portion is used to heat steam in a steam turbine (e.g., a combined cycle power plant (CCPP), or multi-stage steam turbine), the first portion generates waste heat and the steam turbine recovers that heat to produce electricity. For example, in a CCPP a gas turbine generator generates electricity and the waste heat is used to make steam to generate additional electricity via a steam turbine. Utilizing the waste heat to make steam for use in a steam turbine enhances the efficiency of electricity generation.

An increase in temperature of the steam passing into an inlet throttle of a steam turbine has been shown to have a direct effect on the efficiency of entire CCPP. Indeed, an increase in the steam inlet temperature of around 50° F. attributes to a considerable increase in the plant efficiency. Experience has shown, however, that even 50° F. increase in the steam temperature may affect the steam turbine's rotor life.

The problem is usually overcome by using more temperature resistant rotor material. Such a solution, however, typically increases costs.

BRIEF DESCRIPTION OF THE INVENTION

According to one aspect of the invention, a steam turbine that includes a rotor having a plurality of early stages is provided. The turbine includes a stator portion surrounding a portion of the rotor and arranged such that a leakage region exists between the stator portion and the rotor and having a cooling steam channel that passes cooling steam from one portion of the stator portion to the leakage region. The turbine also includes at least one cooling steam transmission channel axially displaced about the rotor that receives the cooling steam from the leakage region and provides it to at least a portion of the early stages.

According to another aspect of the invention, a method of cooling one or more early stages in a steam turbine is provided. The method includes providing high-pressure low-temperature steam through cooling steam channels formed in a stator component that surrounds at least portion of a rotor to a leakage region; passing the high-pressure low-temperature steam provided to the leakage region through cooling steam transmission channels formed in a rotor; and passing the high-pressure low-temperature steam through holes in the cooling steam transmission channels to contact the one or more early stages.

According to yet another aspect, a power plant including a steam turbine is provided. The steam turbine includes a rotor having a plurality of early stages and a stator component surrounding a portion of the rotor and arranged such that a leakage region exists between the stator component and the rotor and having a cooling steam channel that passes cooling steam from one portion of the stator component to the leakage region. The steam turbine also includes at least one cooling steam transmission channel axially displaced about the rotor that receives the cooling steam from the leakage region and provides it to at least a portion of the early stages.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 shows a side view of a stator portion having a cooling steam transmission channel passing there through.

The detailed description explains embodiments of the invention, together with advantages and features, by way of example with reference to the drawings.

DETAILED DESCRIPTION OF THE INVENTION

As discussed above, the increased temperatures that allow for greater combined cycle efficiency may not be beneficial to rotors in a steam turbine portion of a combined cycle power plant. Of course, the same problem could exist in stand-alone steam turbines. Embodiments disclosed herein may reduce or eliminate these problems by providing a cooling steam to a few initial stages of the rotor. This cooling steam may help keep these initial stages cool and, therefore, help avoid the need to replace the entire rotor with higher temperature capability material. In one embodiment, the cooling steam need only be provided to an initial few stages of the rotor through which the main steam temperature drops enough to be withstood by lower temperature resistant material.

Figure 1:
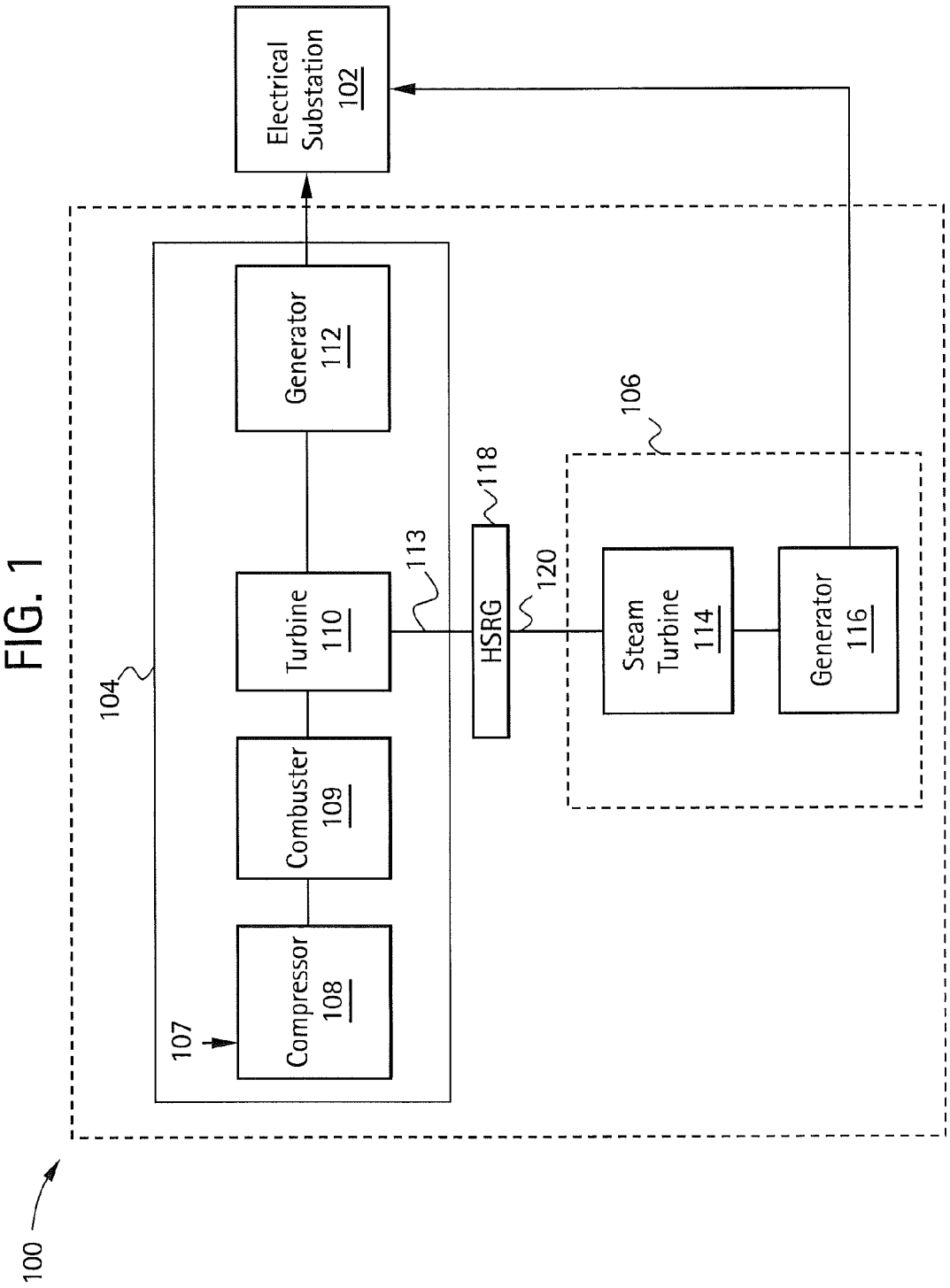
FIG. 1 is shows a block diagram of a combined cycle power plant.

FIG. 1 shows a block diagram of a combined cycle power plant 100 coupled to an electrical substation 102. The combined cycle power plant 100 creates electricity and provides it to the electrical substation 102.

The combined cycle power plant 100 may include a gas turbine portion 104 and a steam turbine portion 106. The gas turbine portion 104 includes a compressor 108 that includes an air intake 107. The compressor 108 is coupled to a combustor 109 that combusts a gas or fuel oil in a stream of compressed air. The combustor 109 is coupled to a turbine 110. The turbine 110 extracts energy from a flow of hot gas produced by combustion of gas or fuel. In one embodiment, the extracted energy is converted to electricity by a first generator 112.

The output 113 of the gas turbine 110 is an exhaust gas that may be used in other cycles of the combined system 100. The exhaust gas may be used, for example, to heat steam for use in the steam turbine portion 106. To that end, the system combined cycle power plant may include a heat recovery steam generator (HRSG) 118 coupled to the output 113.

The HRSG 118 receives the exhaust gas and uses it to heat steam/water to an elevated temperature. The high temperature steam is provided via steam channel 120 to the steam turbine portion 106.

The steam turbine portion 106 includes a steam turbine 114. The steam turbine 114 receives steam from the HRSG 118. The steam is passed over rotors in the steam turbine 114 causing portions of the steam turbine 114 to rotate. This rotational energy is converted to electricity by the second generator 116 and the electricity is provided to the electrical substation 102.

Figure 2:
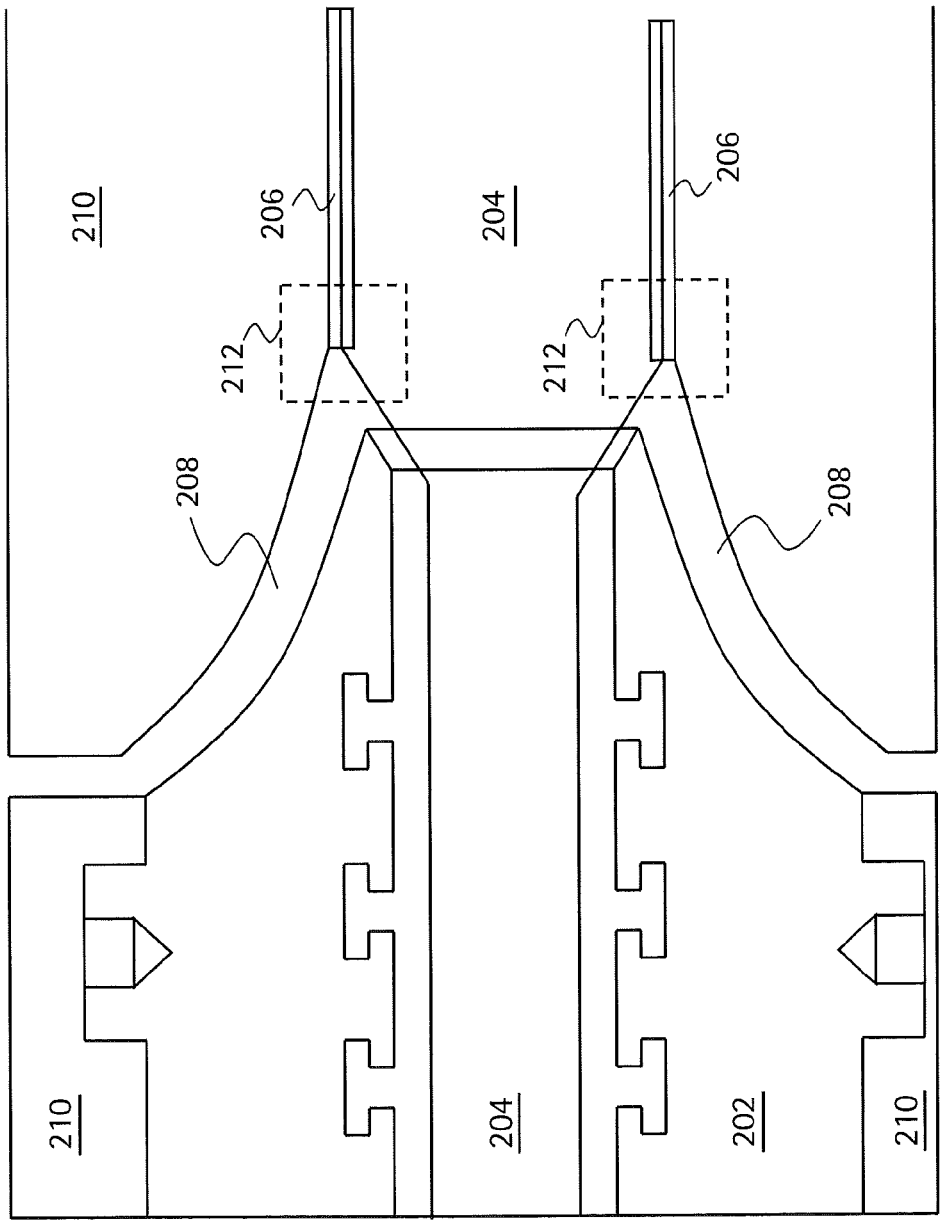
FIG. 2 is cut-away front view of a portion of steam turbine that may be utilized in a combined cycle power plant.

FIG. 2 shows a cut-away front view of a portion of a steam turbine 114. The portion of the steam turbine 114 shown in FIG. 2 includes a stator component 202. The stator component 202 is typically cylindrical and surrounds a portion of a rotor 204. The rotor 204 includes early stages 206 to which high-pressure high-temperature steam is passed via one or more steam channel(s) 208. The high-pressure high-temperature steam causes the rotor 204 to turn and, thereby, the steam turbine 114 may be used to create electricity. Another portion of the rotor 204 and at least a portion of stator component 202 are surrounded by a casing 210. The steam channel(s) 208 typically pass through the casing 210.

As discussed above, the initial few stages (shown in dashed boxes 212, also referred to herein as "early stages") of the rotor 204 may be damaged if the temperature of the incoming high-pressure high-temperature steam (received, for example, from HRSG 118 (FIG. 1)) is too high. One approach has been to cool a portion of the steam separately from the remainder of the steam and to recombine the steam to create cooler steam before it is provided to the rotors. Such an approach may be effective but it means that heat is lost and requires the use of a heat exchanger to reduce the temperature of cooled steam.

Figure 3:
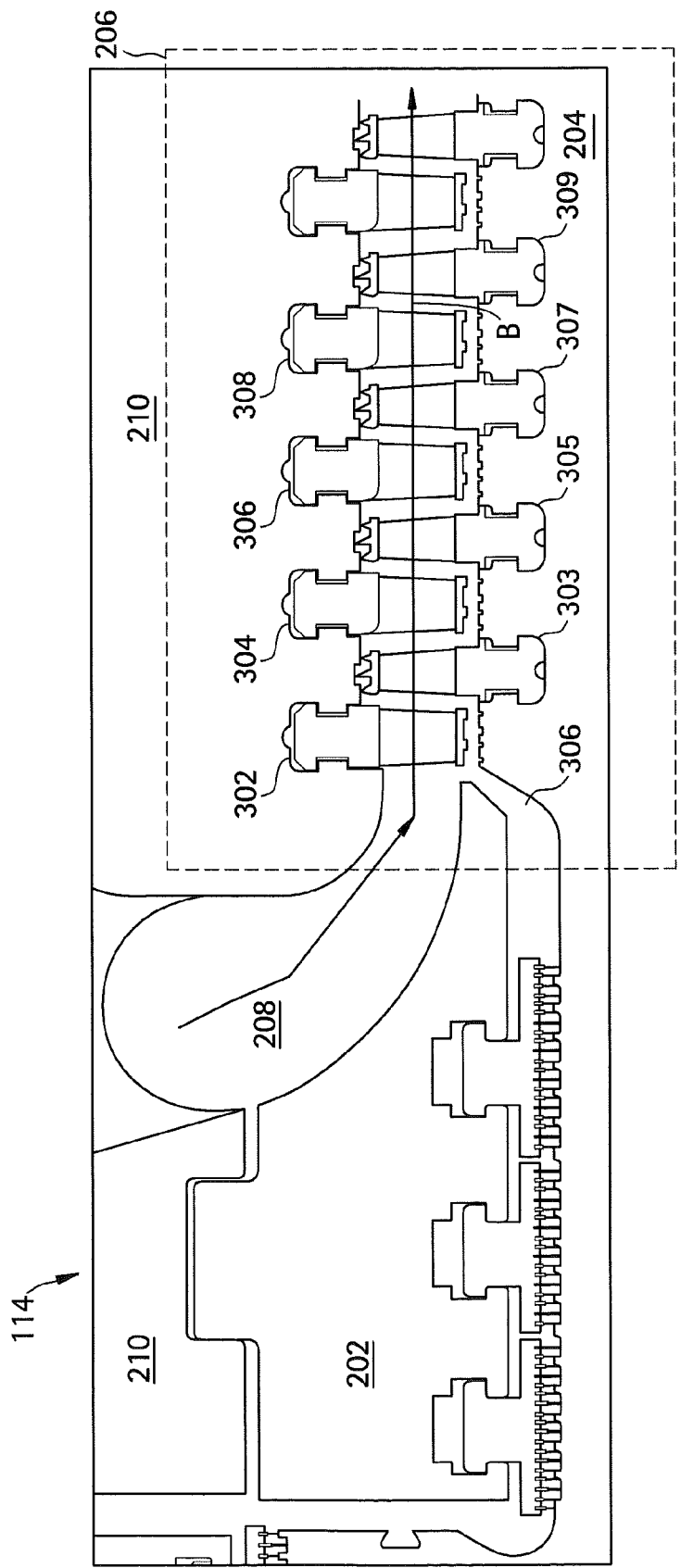
FIG. 3 is a more detailed depiction of the portion of a steam turbine shown in FIG. 2.

FIG. 3 shows a more detailed depiction of a portion of the steam turbine 114 shown in FIG. 2. The portion of the steam turbine 114 shown in FIG. 3 includes a stator component 202. The rotor 204 includes early stages 206 to which high-pressure high-temperature steam is passed via one or more steam channel(s) 208. The early stages 206 include inlet nozzles 302, 304, 306 and 308. Of course the early stages 206 could include more or fewer inlet nozzles shown in FIG. 3. The early stages 206 also include rotor blades 303, 305, 307 and 309. Of course the early stages 206 could include more or fewer rotor blades than those shown in FIG. 3. The steam channel(s) 208 typically pass through the casing 210. Steam enters the steam channel(s) 208 as indicated by arrow A and passes down the length of the rotor 204 (through the early stages 206) as indicated by arrow B.

As discussed above, in some cases the steam that enters the early stages 206 via the steam channels 208 (as indicated by arrow A) may be at a temperature that damages the early states 206. Embodiments disclosed herein may alleviate such a problem by providing cooling steam in form of a relatively high-pressure low-temperature steam to the initial few stages of the steam turbine rotor. The steam may be admitted through a channel in the stator and passed through axial displaced cooling steam transmission channels that pass through the rotor and are close to an outer edge of the rotor. The steam may be from an external source or from an internal source such as exhaust or intermediate stages of a high pressure turbine and passed through the cooling steam channels provided in the stator. The steam is released near the stage 1 nozzle. A portion of the admitted steam passes through the end packing seals, a portion joins back to the main flow and the rest passes through the cooling steam transmission channel. The steam passing through the cooling steam transmission channels cools the rotors and reduces the amount of heat penetrating into the rotor further.

Figure 4:
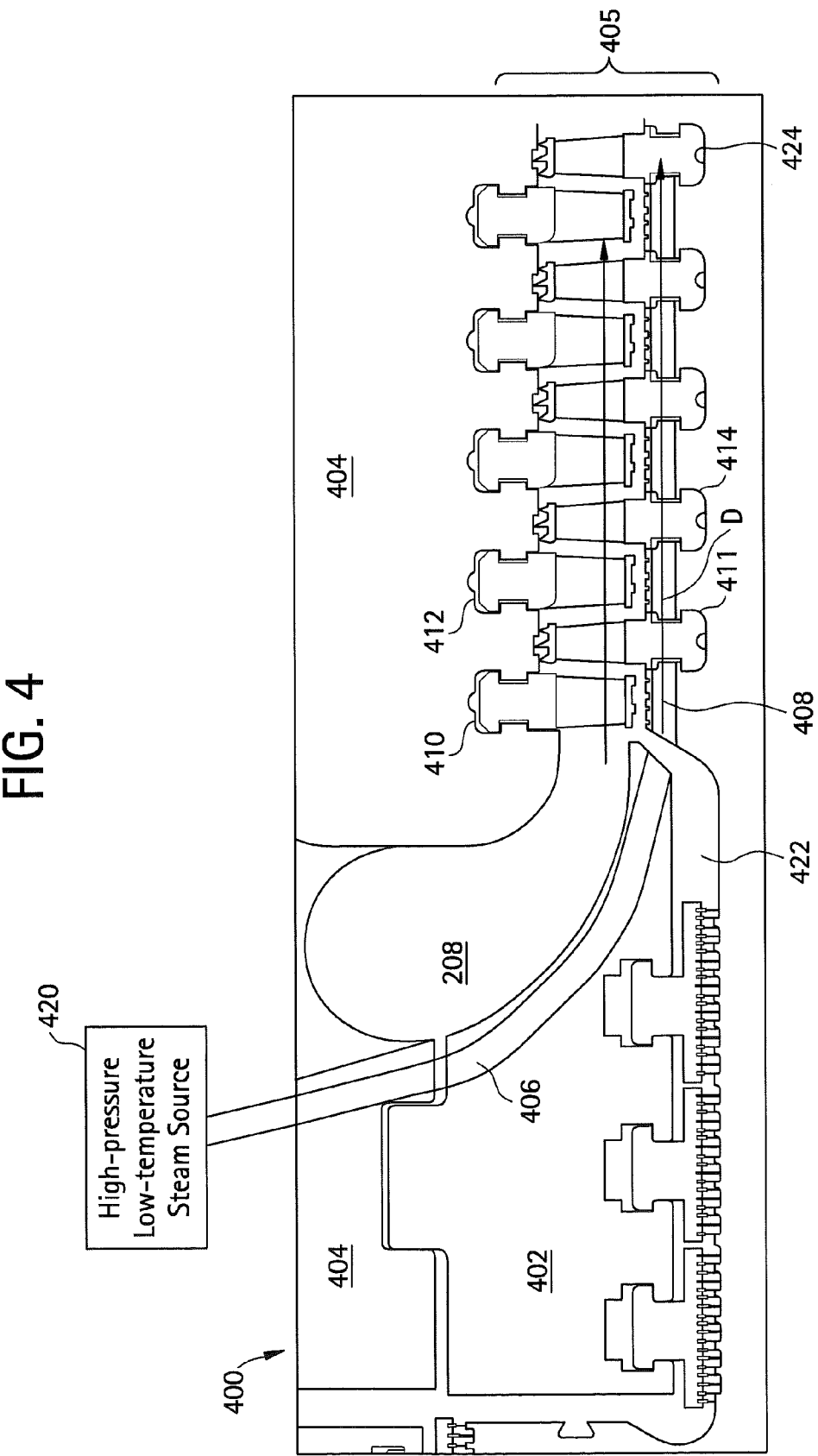
FIG. 4 is a cut-away front view of a portion of steam turbine according to one embodiment.

FIG. 4 shows an example of a portion of a steam turbine 400 according to one embodiment. In this embodiment, the shown portion of the steam turbine 400 includes a stator component 402 that surround at least a portion of a rotor. A casing 404 surrounds at least a portion of the stator component 402. The casing 404 may also surround a portion of the rotor 405. The stator component 402 includes a cooling steam channel 406. The cooling steam channel 406 may provide high-pressure low-temperature steam through the stator component 402. The cooling steam channel 406 may, in one embodiment, also pass through the casing 404.

The cooling steam channel 406 may be coupled to a steam source 420. The steam source 420 may be a high-pressure low-temperature steam source in one embodiment. High-pressure is a term known in the steam turbine art and shall be so interpreted herein. Low-temperature, as used herein with respect to steam, shall refer to steam that is of a lower temperature than steam provided through steam channel 208. In one embodiment, the low temperature steam is at least 50° C. cooler than the steam provided through the steam channel 208. Of course, the low temperature steam could be more or less than 50° C. cooler than the steam provided through the steam channel 208.

In one embodiment, the cooling steam channel 208 may provide steam through the casing 404 and the stator component 402 to an inlet of a packing flow leakage region 422 which is located near the first stage nozzle 410. The packing flow leakage region 422 may be in fluid communication with one or more cooling steam transmission channels 408. Each cooling steam transmission channel 408 is an axial fluid (or steam) transport mechanism such as, for example, a pipe. The cooling steam transmission channel 408 is arranged such that it may provide steam to one or more initial stages (e.g. rotors 411 and 414) of the rotor 405. In one embodiment, holes are formed in the cooling steam transmission channel 408 such that steam passing there through may cool the rotors. The steam passes through the cooling steam transmission channel 408 in the direction indicated by arrow D. In general, radial slots may be provided on the bucket shanks of the last stage intended to be cooled. For example, the last stage is shown by rotor blade 424 of FIG. 4. This allows the high-pressure lower-temperature steam to return to the main flow path A thereby avoiding the high temperature main flow path steam entering into the cooling holes of further downstream stages.

Figure 5:
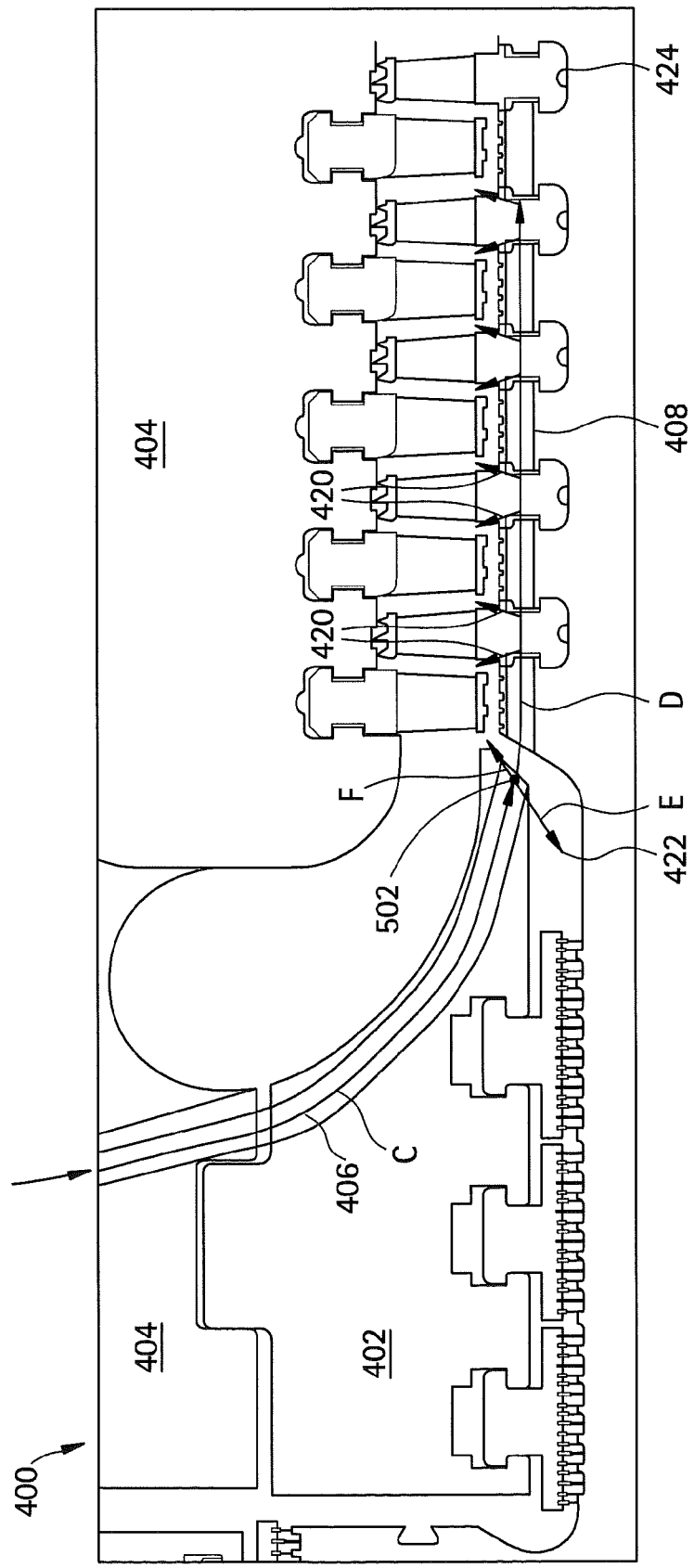
FIG. 5 shows possible steam paths for the portion of the steam turbine shown in FIG. 4.

FIG. 5 shows a detailed depiction of the paths that may be taken by the high-pressure low-temperature steam (also referred to as "cooling steam") in a portion of a steam turbine. The cooling steam is provided to the inlet 502 of the packing flow leakage region 422 as indicated by arrow C. Some of the cooling steam flows into the main flow path A as indicated by arrow F. Another portion of the cooling steam flows in the packing flow leakage region 422 as indicated by arrow E. The majority of the steam, however, passes through cooling steam transmission channel 408 as indicated by arrow D. The cooling steam transmission channel 408 has radial holes in either bucket shank or the rotor or both. These radial holes allow the low temperature high pressure steam to flow back into the high pressure high temperature steam flow shown by arrow A. It shall be understood that the inlet 502 may provide an inlet into an annulus to which multiple cooling steam transmission channels 408 are in fluid communication.

In one embodiment, the cooling steam channel(s) 406 may be formed in the stator component 402 when it is constructed. In another embodiment, the cooling steam channel(s) 406 may be provided to a previously formed stator component 402.

Figure 6:
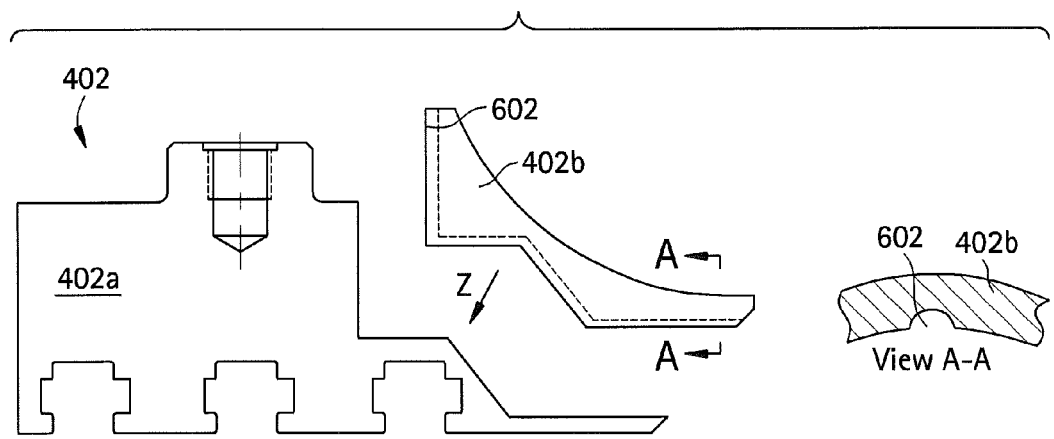
FIG. 6 shows one manner in which a cooling steam path may be created in a stator portion according to one embodiment.

FIG. 6 shows a cut-away front view of two portions, 402a and 402b, of a stator component 402. The two portions may have been cut from a pre-formed stator component 402. The second portion 402b has a groove 602 formed therein. This groove 602 allows steam to pass through the stator component 402 when portions 402a and 402b are joined together as indicated by arrow Z. Of course, the groove 602 could be formed in the first portion 402a rather than the second portion 402b, or in both.

Figure 7:
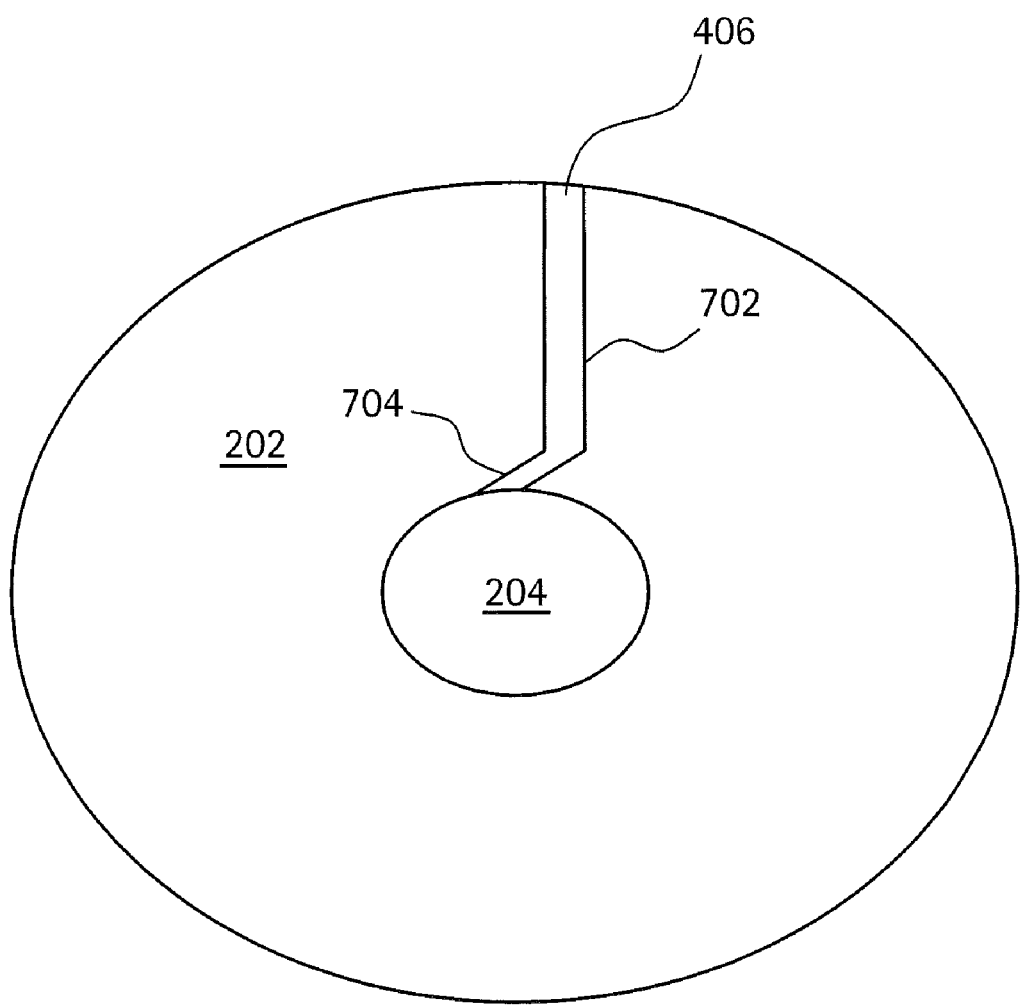

FIG. 7 shows a side view of stator component 202 according to one embodiment. The stator component 202 surrounds at least a portion of a rotor 204. The stator component 202 includes a cooling steam channel 406 as described above. In this embodiment, the cooling steam transmission channel 406 includes a first portion 702 and an angled portion 704. The angled portion 704 may be at any angle relative to the first portion 702 so long as it provides a path form the first portion 702 to the transmission holes (not shown) in the rotor 204. In general, the angled portion cooling stream channel 406 may reduce the pressure drop of the steam while entering the transmission channels in the rotor.

It should be noted that the cross section of the cooling steam transmission channel in any of the embodiments described above, may take one a variety of different shapes without departing from the teachings herein. For instance, the cooling steam channel may be round or elliptical in cross section.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A steam turbine comprising:
   a rotor having a plurality of early stages;
   a stator portion surrounding a portion of the rotor and arranged such that a leakage region exists between the stator portion and the rotor and having a cooling steam channel that passes cooling steam from one portion of the stator portion to the leakage region; and
   at least one cooling steam transmission channel axially displaced about the rotor that receives the cooling steam from the leakage region and provides it to at least a portion of the early stages, wherein the at least one cooling steam transmission channel includes a plurality of holes formed therein.

2. The steam turbine of claim 1, wherein each early stage includes a nozzle and a rotor blade.

3. The steam turbine of claim 2, wherein the at least one cooling steam transmission channel is closer to the rotor blade than the nozzle of at least one early stage.

4. The steam turbine of claim 1, wherein at least one of the plurality of early stages includes passages formed to allow for steam exiting the plurality of holes in the cooling steam transmission channel to enter the at least one of the plurality of early stages.

5. The steam turbine of claim 1, further comprising:
   a casing that surrounds at least a portion of the stator portion and having a casing cooling steam channel therein, the casing cooling steam channel being arranged in fluid communication with the cooling steam channel.

6. The steam turbine of claim 5, further comprising:
   a steam source that provides high-pressure low-temperature steam to the casing steam channel.

7. The steam turbine of claim 1, in combination with a gas turbine.

8. The steam turbine of claim 1, further comprising:
   a plurality of cooling steam transmission channels axially displaced about the rotor that receive the cooling steam from the leakage region and provides cooling steam to at least a portion of the plurality of early stages.

9. The steam turbine of claim 1, wherein the stator portion is formed by cutting an original stator portion into two portions and forming a groove in at least one of the portions and rejoining the two portions to for the stator portion.

10. A method of cooling one or more early stages in a steam turbine:
    providing high-pressure low-temperature steam through cooling steam channels formed in a stator component that surrounds at least portion of a rotor to a leakage region;
    passing the high-pressure low-temperature steam provided to the leakage region through cooling steam transmission channels formed in a rotor; and
    passing the high-pressure low-temperature steam through holes in the cooling steam transmission channels to contact the one or more early stages.

11. The method of claim 10, wherein the high-pressure low-temperature steam is provided by at least one of: an external source, from an exhaust of another turbine, and an intermediate stage of the another turbine.

12. The method of claim 10, wherein providing includes passing the high-pressure low-temperature steam through a channel formed in a casing that at least partially surrounds stator component.

13. The method of claim 10, further comprising:
    providing high-pressure high-temperature steam to the one or more early stages.

14. The method of claim 13, wherein the high-pressure low-temperature steam is at a lower temperature than the high-pressure high-temperature steam.

15. A power plant comprising:
    a steam turbine including:
    a rotor having a plurality of early stages;
    a stator component surrounding a portion of the rotor and arranged such that a leakage region exists between the stator component and the rotor and having a cooling steam channel that passes cooling steam from one portion of the stator component to the leakage region; and
    at least one cooling steam transmission channel axially displaced about the rotor that receives the cooling steam from the leakage region and provides it to at least a portion of the early stages, wherein the at least one cooling steam transmission channel includes a plurality of holes formed therein.

16. The power plant of claim 15, further comprising:
    a heat recovery steam generator operably coupled to the steam turbine.

17. The power plant of claim 15, wherein at least one of the plurality of early stages includes holes formed to allow for steam exiting the plurality of holes in the cooling steam transmission channel to enter the at least one of the plurality of early stages.

18. The power plant of claim 15, wherein the cooling steam channel includes a first portion and angled portion angled with respect to the first portion.

* * * * *